United States Patent [19]

Weimer

[11] 3,856,989

[45] Dec. 24, 1974

[54] SENSORS HAVING CHARGE TRANSFER RECYCLING MEANS

[75] Inventor: Paul Kessler Weimer, Princeton, N.J.

[73] Assignee: RCA Corporation, New York, N.Y.

[22] Filed: Aug. 31, 1973

[21] Appl. No.: 393,628

[30] Foreign Application Priority Data

Sept. 25, 1972 Great Britain .................... 44295/72

[52] U.S. Cl. .............. 178/7.1, 250/211 R, 250/578, 315/169 TV

[51] Int. Cl. ............................................ H04n 5/30

[58] Field of Search....... 178/7.1, DIG. 26, DIG. 12; 250/211 J, 211 R, 578; 315/169 R, 169 TV

[56] References Cited

UNITED STATES PATENTS

| | | | |
|---|---|---|---|
| 3,555,180 | 1/1971 | Cook | 178/7.1 |
| 3,751,586 | 8/1973 | Johansson | 178/7.1 |

OTHER PUBLICATIONS

IBM Technical Disclosure Bulletin, Vol. 15, No. 11, pp. 3506, 3507, April 1973.

*Primary Examiner*—Robert L. Richardson
*Attorney, Agent, or Firm*—H. Christoffersen; Henry I. Schanzer

[57] ABSTRACT

A sensor including an image sensor array having sensing elements arranged in rows and columns and vertical charge transfer registers integral to the array, said registers having input nodes equal in number to said elements. Signals from the sensing element are transferred in parallel each to a different one of the nodes. The sensor includes means for transferring the signal from each node and for recycling the signal from a given node back to said given node to permit addition or subtraction with a successive bit of information, within the sensor array. The read-out and recycling means may be used to remove spurious background signals from the output signal, for moving target detection or for the non-destructive read-out of stored images.

14 Claims, 16 Drawing Figures

| FRAME 0 | FRAME 1 | FRAME 2 | FRAME 3 |
|---|---|---|---|
| MODE 1<br>NORMAL OPERATION<br>(CONTINUOUS LIGHT<br>NO FEEDBACK) | SENSORS ILLUMINATED<br>NO RECYCLING<br>VIDEO OUT AT 17 : VIDEO FROM FRAME 0 | SENSOR ILLUMINATED<br>NO RECYCLING<br>VIDEO OUT AT 17 : VIDEO FROM FRAME 1 | SENSOR ILLUMINATED<br>NO RECYCLING<br>VIDEO OUT AT 17 : VIDEO FROM FRAME 2 |
| MODE 2 ●<br>DARK CURRENT<br>SUBTRACTED | SENSORS ILLUMINATED<br>NEGATIVE DARK SIGNALS FROM FRAME 0 RETURNED TO ARRAY<br>VIDEO OUT AT 17 : ZERO | SENSORS IN DARK<br>NO RECYCLING<br>VIDEO OUT : (VIDEO FROM FRAME 1 MINUS DARK SIGNAL FROM FRAME 0) | SENSORS ILLUMINATED<br>NEGATIVE DARK SIGNAL FROM FRAME 2 RETURNED TO ARRAY<br>VIDEO AT 17 : ZERO |
| MODE 3<br>MOVING TARGET<br>INDICATOR | SENSORS ILLUMINATED<br>NEGATIVE SIGNALS FROM FRAME 0 RETURNED TO ARRAY<br>VIDEO OUT AT 17 : ZERO | SENSORS ILLUMINATED<br>NO RECYCLING<br>VIDEO OUT: SIGNAL FROM FRAME 2 MINUS SIGNAL FROM FRAME 1 | SENSORS ILLUMINATED<br>NEGATIVE SIGNAL FROM FRAME 2 RETURNED TO ARRAY<br>VIDEO OUT : ZERO |
| MODE 4<br>MULTIPLE-SCAN<br>RECIRCULATED<br>IMAGE | SENSORS ILLUMINATED<br>NO RECYCLING<br>NO VIDEO OUT | SENSORS IN DARK<br>POSITIVE SIGNAL FROM FRAME 1 RETURNED<br>VIDEO OUT: SIGNAL FROM FRAME 1 | SENSORS IN DARK<br>POSITIVE SIGNAL FROM FRAME 2 RETURNED<br>VIDEO OUT: SIGNAL FROM FRAME 2 |

TABLE 1

Fig. 4.

SENSORS HAVING CHARGE TRANSFER RECYCLING MEANS

This invention relates to solid state sensors and particularly to sensors having charge transfer means for recycling information produced by the sensor.

Sensors such as those for detecting images in the visible and infrared range include sensing elements having some leakage current. The leakage current, also called the dark current in image sensors, is produced by the sensing elements even though no energizing signal is applied to the elements. The leakage current of each element acts as a source of background or fixed noise which may mask low level signals produced by the element. The sensing elements of a photosensor array are normally irradiated with light or other electro-magnetic radiation for a period of time, defined as the integration period, before they are read out. The leakage or dark current of these elements is accumulated for the same integration period as the light or signal pattern. At low light levels and/or for long integration periods, the voltage level due to the leakage current becomes significant in comparison to the actual photo signal level. The photo signal may thus be lost because it is a small portion of the total voltage (signal plus noise) level produced by an element. The problem of extracting the photo signal from the background noise is rendered more difficult by the fact that the leakage or dark current is not uniform from element-to-element. This requires that the noise and the signal from each element be individually treated.

Although leakage current is the major source of background noise some spurious noise is injected into the signal by the scanning circuits which extract the signals from the sensing elements and pass the signals to a video output point or other utilization point. These and other sources of noise limit the low input signal level at which the sensor can be used. It is, therefore, desirable to eliminate in whole or in part the background noise and the spurious noise to effectively extend the range in which the sensor can detect useful signals.

Circuits embodying the invention include an array of sensing elements and means for transferring the signals produced at each sensing element to a node associated with that element. Charge transfer means coupled to the nodes transfer the signals from each node and recycle the signal from a given node back to said given node. The recycling means may be used to cancel at least a portion of the background noise produced in the sensor and its associated scanning circuitry by addition or subtraction of signals at said nodes.

In the accompanying drawings, like reference characters denote like components; and FIG. 1 is a block diagram of an image sensor system embodying the invention;

FIG. 4 is a table detailing four modes of operation of the circuit of FIG. 3;

Figure 1:
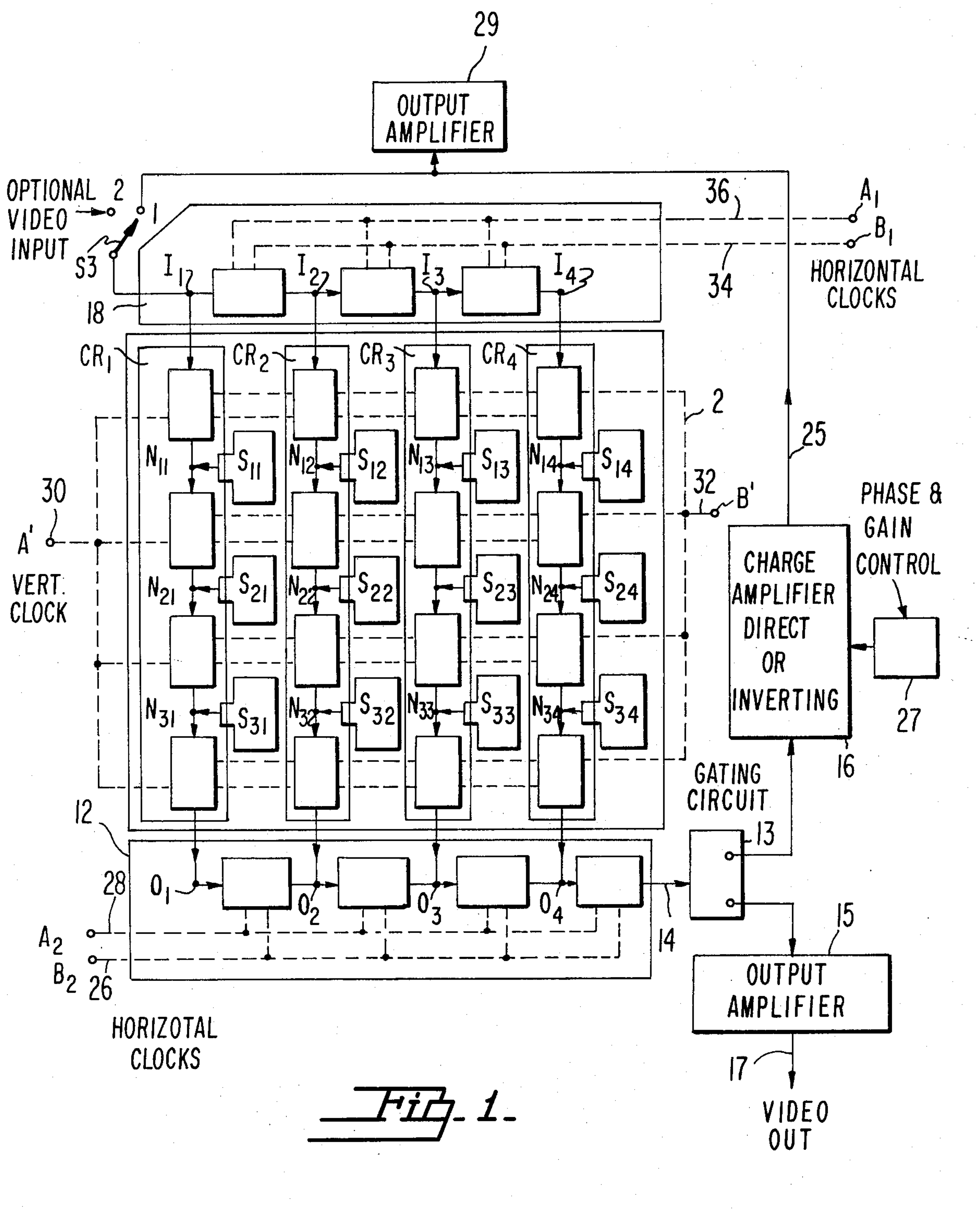
FIG. 1 is a block diagram of an image sensor which includes means for recycling the video output signal back into the sensor.

The circuit of FIG. 1 includes a matrix array, 2, which is comprised of light sensitive or charge storage elements arranged in columns and rows denoted by the characters $S_{ij}$, where i defines the row and j the column. Associated with each column of elements is a vertical or column charge transfer register (CR1, CR2, CR3 and CR4) having input nodes denoted by $N_{ij}$. The information of each element, $S_{ij}$, is selectively transferred to the correspondingly numbered node, $N_{ij}$, of its associated column register. In practice, information stored in the elements, $S_{ij}$, is transferred, in parallel, to the column registers. Each column register also includes an input terminal (I1, I2, I3, I4) connected to a different one of the stages of input register 18 and an output terminal (01, 02, 03, 04) connected to a different one of the stages of output register 12.

Conductors 26, 28, 30, 32, 34, and 36 to which are applied the various clock signals are shown by dotted lines. Conductors 26 and 28 to which are applied the B2 and A2 horizontal clock signals, respectively, are connected to the stages of register 12. Conductors 30 and 32 to which are applied the A′ and B′ vertical clock signals, respectively, are connected to the stages of the column registers. Conductors 34 and 36 to which are applied the A1 and B1 clock signals, respectively, are connected to the stages of register 18.

Vertical clock signals A′ and B′ applied to the column registers cause the information in each of the column registers to be transferred down the column registers in the direction indicated by the arrows. The line of video information contained in the last stage of the column registers is transferred, at one time, to terminals 01–04 of output register 12 which is thereby loaded in parallel.

Horizontal clock signals A2 and B2 applied to register 12 cause the information in the register to be sequentially advanced and produced at output terminal 14. When a line of information is transferred out of register 12, a new line of information is transferred from the column registers into register 12.

The signals present at output terminal 14 are applied to gating circuit 13 which controls the routing of the signals to output amplifier 15 or to the input of amplifier 16. Signals routed to output amplifier 15 result in the production of amplified signals at output terminal 17, denoted the video output, which may be inverted or non-inverted. Signals routed to input 19 of amplifier 16 result in the production of amplified signals at output terminal 25 having the same sequence and rate as the input signals, but which may be inverted or non-inverted with respect to the input signals. Amplifier 16 may be connected as an inverting amplifier or as a non-inverting amplifier by means of phase and gain control circuit 27 connected to amplifier 16. The signals at the output 25 are thus equal to $Ae_s$ or $-Ae_s$ depending on the amplifier connection; where A is the gain of the amplifier and $e_s$ is the signal applied to input terminal 19. In the discussion to follow it will be assumed that A is unity.

The output 25 of amplifier 16 is connected by means of switch S3 to the input I1 of charge transfer register 18. The input to register 18 and the output of each stage of register 18 is connected to a different one of the inputs (I1 through I4) of the column registers. Clock pulses A1 and B1 applied to input register 18 have the same rate as clock pulses A2 and B2 applied to register 12, and cause the sequential transfer of signals along register 18. Register 18 is loaded with a row of signals transferred out of register 12. When the transfer of a row of information from register 12 to register 18 is completed, register 18 is fully loaded and register 12 is empty. When register 18 is fully loaded, the signal present at each one of terminals I1 through I4 is a signal initially transferred from the correspondingly numbered column register. Following the transfer of a row of information to register 18, the next A' and B' pulse cause: (1) the information at terminals I1 through I4 to be transferred to the first stage of the column registers; (2) the information in the column registers to advance downward by one stage; and (3) a new line or row of information to be transferred from the column registers to output register 12. This process may be repeated until the row of information is recycled to its row of origin with each bit of information returned to its node of origin.

Switch S3, as detailed below, may be switched to position 2 to coupled the input of register 18 to an input terminal denoted the Optional Video Input. An output amplifier 29, whose use is optional, may be provided to amplify the signals present at output terminal 25 and to couple the signals to some utilization device (not shown).

The charge transfer registers may be either bucket-brigade or charge-coupled registers, and the sensor elements can be of any type. That is, the sensor elements may be photoconductors responsive to infrared or visible light, pyroelectric devices, photodiodes, phototransistors or any other known elements suitable for detecting signals. The gating circuit 13, switch S3 and the phase and gain control circuit 27 enable the image sensor system to be operated in many different modes. One mode of operation includes recycling the information from the sensor array back into the sensor array. This mode of operation enables the addition or subtraction of a first signal recycled to a node with a second signal transferred to that node. The addition or subtraction of signals at and within the array is an important feature of the invention. Some of the advantages of recycling are discussed below.

In the operation of the system of FIG. 1 the signal present at each element $S_{ij}$ may be selectively read-out and transferred to its corresponding node $N_{ij}$. The signal from each node may then be recycled to its node of origin. That is, a signal transferred to a node $N_{ij}$, is transferred from node $N_{ij}$ along its corresponding column register CRj to output register 12. The signal is then routed from the output of register 12 to amplifier 16 and from the output of amplifier 16 to input register 18. The signal is then transferred from register 18 along column register CRj back to its node of origin. The recycled information may differ from the original information in two respects. First, the amplitude and polarity of the signal recycled to a node may be altered by means of amplifier 16. For example, a signal $e_{s1}$ produced by an element $S_{ij}$ and initially transferred to node $N_{ij}$ may be returned to node $N_{ij}$ as $\pm Ae_{s1}$; where A is the gain of the amplifier. The information recycled to node $N_{ij}$ may be added to a second signal ($e_{s2}$) produced by element $S_{ij}$ and transferred to node $N_{ij}$. The net signal level at node $N_{ij}$ is then equal to: $e_{s2} \pm Ae_{s1}$. If A is equal to 1 and the sign is negative the net signal at node $N_{ij}$ is equal to $e_{s2} - e_{s1}$. Where $e_{s1}$ represents the background noise level and $e_{s2}$ represents the background noise level plus the photosignal, the net signal at node $N_{ij}$ is the actual photosignal. The background noise which may have been considerably greater than the actual photosignal is cancelled right at the array. The net photo signal may then be transferred through the column registers and output register 12 and routed either through output amplifier 15 to output terminal 17 or through amplifier 16 and the alternate output amplifier 29.

The recycled signal may also differ from the original signal in that the returned signal may include noise interjected into the signal during its transfer through the various registers. Assume that the amplifier is connected as an inverter having unity gain. Then, due to the inversion through the amplifier, the signal recycled to a node will include a component which may be expressed as $-e_n$, where $e_n$ represents spurious noise signals injected by the read-out circuitry. The net signal at a node would thus include a noise component having a value of $-e_n$. However, note that the net signal present at each node $N_{ij}$ is transferred through a column register Cr*j* to output register 12 by means of gating circuit 13 to output amplifier 15. During this transfer that portion of $-e_n$ due to noise in the column register and the output register will be cancelled. Therefore, it is evident that by means of recycling the signal, the fixed background noise produced by the sensing elements of the array, as well as a large portion of the fixed spurious noise injected by the read-out circuitry may to a large extent be cancelled.

Figure 2:
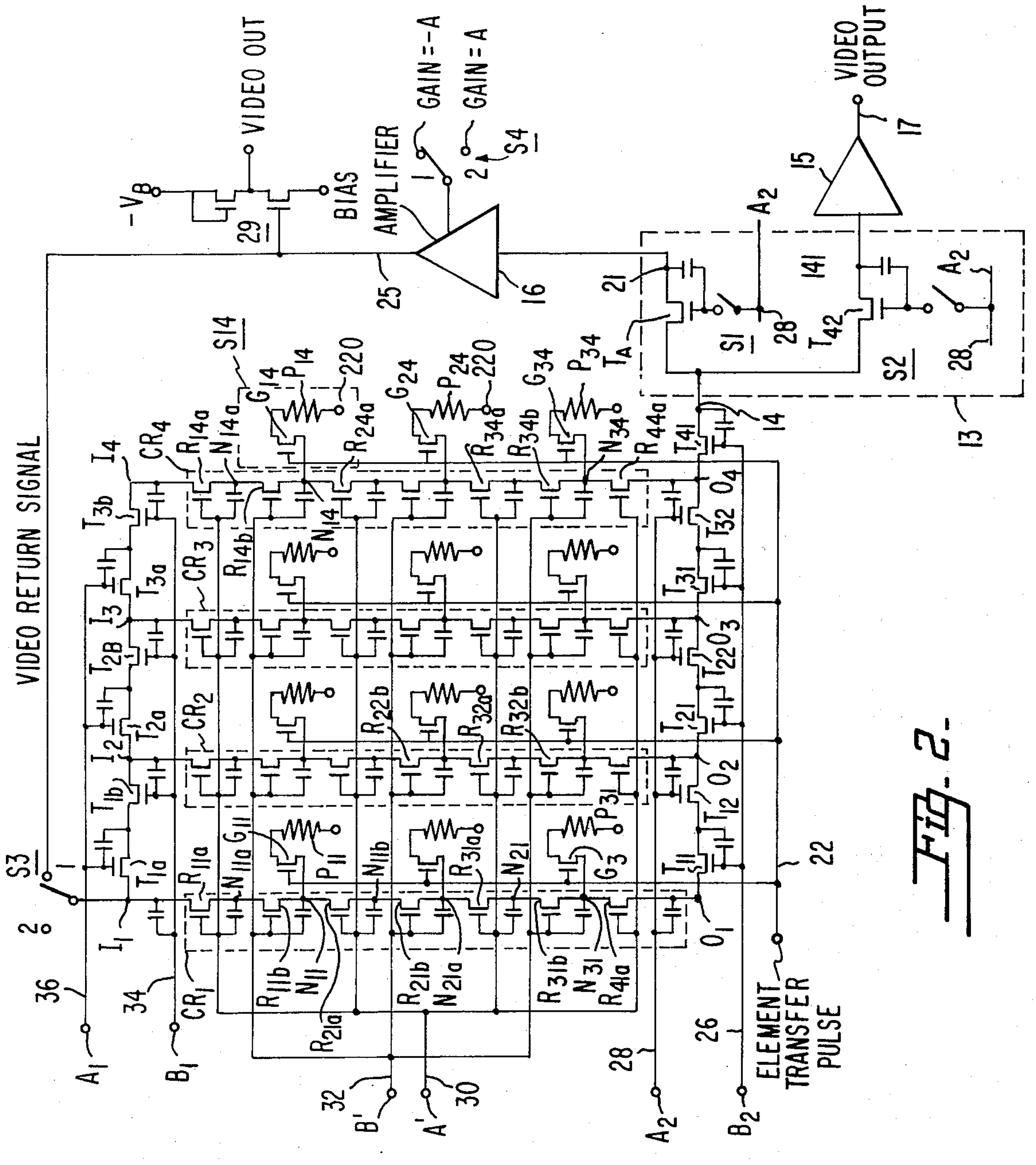
FIG. 2 is a schematic diagram of a sensor array with internal vertical bucket-brigate charge transfer registers embodying the invention.

The system of FIG. 1 may be realized in bucket-brigade formed as shown in FIG. 2 which illustrates a 3 × 4 element sensor array employing bucket-brigate registers and feedback circuits.

In the circuit of FIG. 2 each sensing element $S_{ij}$ includes a photoconductor element $P_{ij}$ and a charge transfer gate $G_{ij}$. Each photoconductor element $P_{ij}$ is connected between a terminal 220 to which is applied a source of fixed potential having a value of -V volts and one end of the conduction path of the corresponding gating transistor $G_{ij}$. The other end of the conduction path of each gating transistor $G_{ij}$ is connected to the correspondingly numbered node $N_{ij}$. A conductor 22 is connected to the gate electrodes of all the gating transistors. An element transfer pulse applied to conductor 22 turns on all the gating transistors $G_{ij}$ concurrently and each bit of photo information is then transferred from an element $P_{ij}$ to the corresponding node $N_{ij}$.

Each one of the column registers, CR1, CR2, CR3, CR4 includes transistors ($R_{ija}$ and $R_{ijb}$) having their source drain paths connected in series between an input terminal (I1, I2, I3, I4) and a like numbered output terminal (01, 02, 03, 04). The gate electrodes of the transistors denoted with an "*a*" character are connected in common to conductor 30 to which is applied the A' clock signals. The gate electrodes of the transistor denoted with a "*b*" character are connected in common to conductor 32 to which is applied the B' clock signals.

Output register 12 includes a bucket-brigade register comprised of seven transistors (T11 through T41) having their source drain paths connected in series between terminals 01 and 14. The gate electrodes of the oddnumbered transistors are connected to conductor 26 to which is applied the B2 clock and the gate electrodes of the even-numbered transistors are connected to conductor 28 to which is applied the A2 clock. Output terminal 14 is connected to gating circuit 13.

Gating circuit 13 includes switch means, illustrated by switches S1 and S2, for routing the signals from terminal 14 to amplifiers 15 and/or 16. When switch S2 (which is part of gating circuit 13) is closed, the A2 clock signal is applied to the gate electrode of transistor T42 and enables the transfer of signals from terminal 14 to terminal 141. An amplifier 15, which may be any one of a number of well-known amplifiers, is connected at its input to terminal 141 and at its output to video terminal 17.

When switch S1 is closed the signals produced at terminal 14 are routed to amplifier 16. The closure of switch S1 applies the A2 clock signal to the gate of transistor TA which causes the transfer of signals from terminal 14 to terminal 21. Amplifier 16 is connected at its input to terminal 21 and at its output to terminal 25. Connected to amplifier 16 is switch S4 which when put in position 1 sets the gain and phase of amplifier 16 to −A and which when put in position 2 sets the gain and phase of amplifier 16 to A, where A may be any number greater than 0. In the discussion to follow, the gain A will be assumed to be unity and amplifier 16 may thus be adjusted by means of switch S4 to have a voltage gain of +1 or −1. Amplifier 16 may be any one of a number of amplifiers but is preferably a charge amplifier of the type described in my copending application entitled "Charge Amplifier" bearing Ser. No. 393,554. It should be evident to those skilled in the art that the function of amplifier 16 and switch S4 may be performed in many different ways.

The output 25 of the amplifier 16 is connected to the input I1 of input register 18 when switch S3 is in position 1. Input register 18 includes six transistors (T1$a$ through T3$b$) having their source drain paths connected in series between terminals I1 and I4. The gate electrodes of the transistors denoted with the character $a$ are connected to conductor 30 to which is applied the A1 clock and the gate electrodes of the transistors denoted with the character $b$ are connected to conductor 32 to which is applied to the B1 clock.

Figure 3:
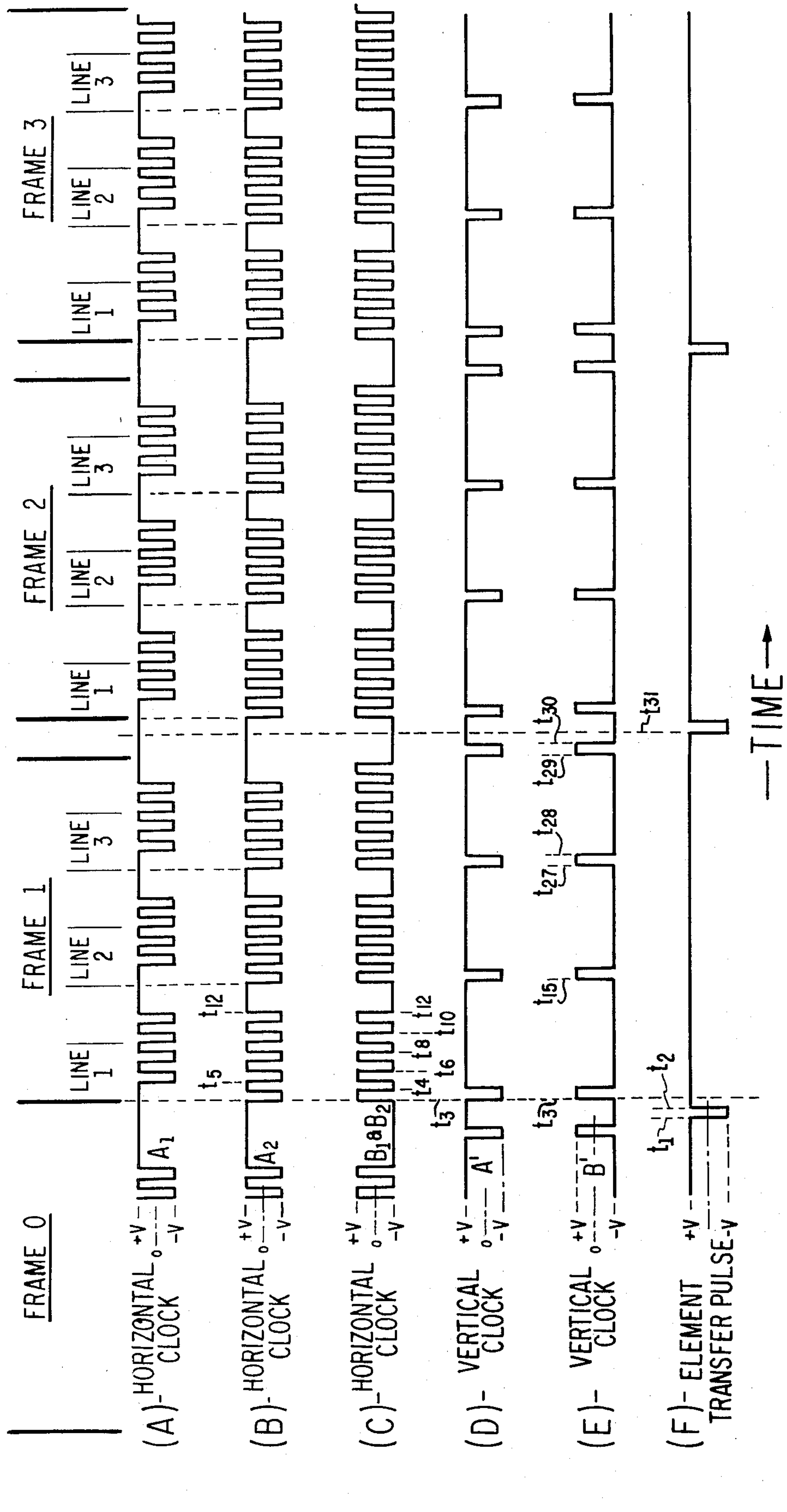
FIG. 3 is a diagram of waveforms applied at various points of the circuit of FIG. 2.

Various modes of operating the circuit of FIG. 2 are best understood with reference to the waveforms of FIG. 3 and to Table 1 of FIG. 4 which summarizes four of the modes of operation of this type of sensor. It is assumed, by way of example only, that the transistors in the circuit of FIG. 2 are P-type devices. Accordingly, the waveforms shown in FIG. 3 are for P-type transistors.

In the first mode of operation (Mode 1) the video information is routed to output amplifier 15 and there is no recycling of signal, (i.e. switch S2 is closed and switch S1 is open). In Mode 1, light integration in the sensor element can be as long or as short as desired. However, for ease of the explanation to follow it will be assumed that the sensing elements are scanned at fixed intervals. Between scans, the signal at each element is integrated or accumulated for a fixed integration period which may also be defined as a frame period. The signals accumulated during a frame period will be referred to as a frame of information or a "frame." Thus, the sensing elements $S_{ij}$ are exposed to a scene for a period of time during which a signal is developed at each sensing element which is proportional to the incident light. At selected intervals (e.g. the end of a frame period) the elemental signals are read-out by the application of an element transfer pulse to conductor 22. The element transfer pulse, as shown in waveform F of FIG. 4, goes negative from time $t1$ to $t2$. The pulse turns on all the gating transistors, $G_{ij}$, causing the information contained at each one of the sensor elements $P_{ij}$ to be transferred to the corresponding node $N_{ij}$ of a column register. Information wich was accumulated during a frame period numbered "O" is transferred from the sensing elements to their corresponding nodes from time $t_1$ to $t_2$. At time $t_2$ the nodes and the accumulation of photo responsive signals begins again at each element until the application of the next element transfer pulse.

During the succeeding frame period, numbered frame 1, the information transferred to the nodes of the column registers is read-out sequentially. The negative-going A′ pulse present from time $t_3$ to $t_4$ causes the transfer of the signals at each one of the $N_{ij}$ nodes of the column registers downwards to the next succeeding $N_{ija}$ node. Also, in response to the negative A′ pulse and to the negative A2 pulse present from time $t_3$ to $t_4$ the information in the last stage of the column registers (N31 through N34) is transferred, in parallel, to nodes 01 through 04 of register 12. The information transferred, in parallel, into output register 12 is then sequentially advanced from node-to-node by means of the A2 and B2 clock pulses applied from time $t_2$ to time $t_{12}$. The elemental information is sequentially produced at output terminal 14. The last bit of a line of information (from node 01), is sequenced out of a register on the negative-going transition of the B2 pulse at time $t_{12}$.

Note that at time $t_4$ the A′ pulse returned to +V volts and the B′ pulse made a negative-going transition which transferred (advanced) each bit of information from an $N_{ija}$ to the next $N_{(i+1)j}$ node. Thus, at time $t_{15}$, an A′ pulse loads output register 12 with a new line of video information and advances (downward) the information in the column registers by one node. The process of reading out the register 12 and reloading the register continues until all the elemental signals transferred to nodes $N_{ij}$ at the end of frame "0" are sequentially read-out at terminal 14.

The frame of signals accumulated during frame 1 can then be transferred from the elements $P_{ij}$ to the nodes $N_{ij}$ by an element transfer pulse at time $t_{31}$, as shown in waveform F. Evidently, the rate of the A2 and B2 clock pulses must be greater than $nf_1$ where n is the number of stages in output register 12 and $f_1$ is the rate of the A′ and B′ clock pulses. This is necessary to empty output register 12 before it is reloaded with a new row of information.

In Mode 1 the information sequentially produced at output 14 of register 12 is routed to amplifier 15 which in response thereto produces an amplified signal at terminal 17.

In the mode numbered Mode 2, the background noise portion of the sensing element output due to leakage current (dark current) is cancelled or subtracted out. In Mode 2, as in Mode 1, signals are accumulated at the sensing elements $S_{ij}$ for a frame period and are then transferred to the nodes $N_{ij}$. The information at the nodes $N_{ij}$ is transferred in parallel along the column registers CRj and then sequentially along register 12 as described above for Mode 1. But, in Mode 2 switch S1 is closed, at least on alternate frames, and the information sequentially produced at terminal 14 is routed to input 21 of amplifier 16. With S1 closed, an A2 pulse is applied to the gate of transistor TA transferring the signals from terminal 14 to terminal 21. In Mode 2 switch S4 is set to position 1 and the amplifier is connected as an inverter with a gain of 1. The signals ($-e_s$) produced at output 25 have the same sequence and rate as the signals ($e_s$) applied to input node 21. In this mode switch S3 is in position 1 and output 25 is thereby connected to input I1 of register 18. Clock pulses A1 and B1, which as shown in waveforms A and C of FIG. 3 are synchronous with clock pulses A2 and B2, cause the transfer of signals along register 18.

As shown in FIG. 3, the burst of Al clock pulses begin at time $t_5$, one cycle later than the A1 pulse and the A2 pulse, since it takes one cycle (an A2 and a B2 pulse) to transfer a signal from terminal 04 through amplifier 16 to terminal I1. The clock pulses B1 applied to conductor 34 are identical to clock pulses B2 applied to conductor 26 and may be supplied from the same source. Following the application of a signal to node 11, the next A1 pulse transfers the signal to the drain of transistor T1a. The next B1 pulse transfers the signal from the drain of transistor T1a to terminal I2. With the application of two more A1 and B1 pulses, shift register 18 is fully loaded and nodes I1 through I4 each have a signal initially derived from the correspondingly numbered column.

The next A′ pulse applied to the column registers (e.g. at time $t_{15}$) causes the parallel transfer of signals from nodes I1 through I4 to nodes $N_{1ja}$ of the column registers. The signals at the nodes of the column registers are transferred along the registers as described for Mode 1 above. A signal transferred to a node $N_{ij}$ at time $t_1$ is returned to the same node at time $t_{30}$. Clearly, the information taken from each node may be recycled, with a change in sign, back to its operating mode.

In Mode 2, light may be cut off from the array by means of a shutter which can be a mechanical rotating disc or some type of electronic light valve such as a liquid crystal which acts to pass or block light over the sensor array 2. As indicated in FIG. 3 and Table 1, light is removed from the sensor on alternate frames, (e.g. frame zero, 2, 4, etc.).

During frame zero, leakage current is accumulated at the sensing elements $S_{ij}$ since the array is shuttered. At the end of the frame zero period (at time $t_1$ in FIG. 3), the (noise) signals due to the leakage current accumulated at elements $S_{ij}$ are read out and transferred to the nodes $N_{ij}$ of the vertical registers by means of the element transfer pulse present from time $t_1$ to $t_2$. The information in the vertical registers is advanced, one line at a time, to output register 12 and is sequentially applied to amplifier 16 which inverts the signal. The output of amplifier 16 is recycled through register 18 back to the vertical registers and down the registers until each bit of information is returned to its node of origin.

During the frame 1 period the signals from frame zero are being inverted and fed back to their nodes of origin. At the start of frame 1 the shutter is opened and the array is exposed to an image. Therefore, during the frame 1 period, a picture signal plus a leakage signal is being developed at each one of the sensing elements. Before the end of the frame 1 period all the inverted leakage signals have been returned, with a change of sign, to the same nodal point in each register where they had initially entered the register. On the next element transfer pulse (e.g. at time $t_{31}$) the picture signal plus its leakage signal is transferred to the nodal point and combined with the negative leakage signal fed back to the node. Thus, at time $t_{31}$, at each node $N_{ij}$ the leakage signals from frames 0 and 1 add to produce a cancellation of the leakage signal. The cancellation is the same at all nodes regardless of the variations in leakage current from one element to the next. The net signals present at each node of array 2 may be then transferred down the column registers and through register 12 to terminal 14. The net signals produced at terminal 14 may now be routed through amplifier 15, by closure of switch S2 and opening switch S1, to produce a video output at terminal 17. The net signals will be sequentially read out during frame 2. Note that during frame 2 the array is again shuttered. The frame of information obtained during frame 2 is recycled to the array during frame 3 for cancellation of the noise signals from the photo plus noise signal developed during frame 3.

The sensor can also be used as a moving target indicator. In this mode, numbered Mode 3, the sensor array 2 is continuously illuminated. The signals produced during one frame time (e.g. frame 2) are coupled to amplifier 16, inverted and returned to their nodes of origin. These signals are then added to the signals produced during a succeeding frame period (e.g. frame 3). The net signals are then coupled by means of the gating circuitry to amplifier 15. If successive images are identical, the difference signal produced at each of the nodes will have a constant value 0. The constant value can be displayed on a utilization device connected to output 17 as black. If any part of the second image differs from the first image, the difference signals produced at the nodes will indicate where the motion occurred. This mode of operation is similar to that of Mode 2 except that the sensor is continuously illuminated.

In Mode 4 the sensor is operated to provide a multiple scan of the same picture. In this mode the sensor is illuminated for a given frame period and is then shuttered. The signals produced during the given frame period are read out and are recirculated through amplifier 16. In this mode, switch S4 is connected to position 2 to operate amplifier 16 as a non-inverted amplifier with a gain of 1. The signal derived from each mode is fed back unchanged to the nodes of the array at the same time that a video output signal is being produced at video output 17 or at the output of amplifier 29. By feeding back a signal $e_s$ to the node that produced that signal, a given charge pattern can be read more than once without destroying the stored information.

The number of times the same picture can be read depends on its rate of degradation by leakage currents in the registers. The storage time during which the same information can be read over and over again is comparable to the storage time of a silicon vidicon with the light and beam off. The storage time could be extended by cooling the sensor or using some wider bandgap material than silicon for the registers. Because of the ease of building charge-transfer registers in silicon this material is preferred for the registers at the present time.

Figures 7, 7A, 7B, 7C:
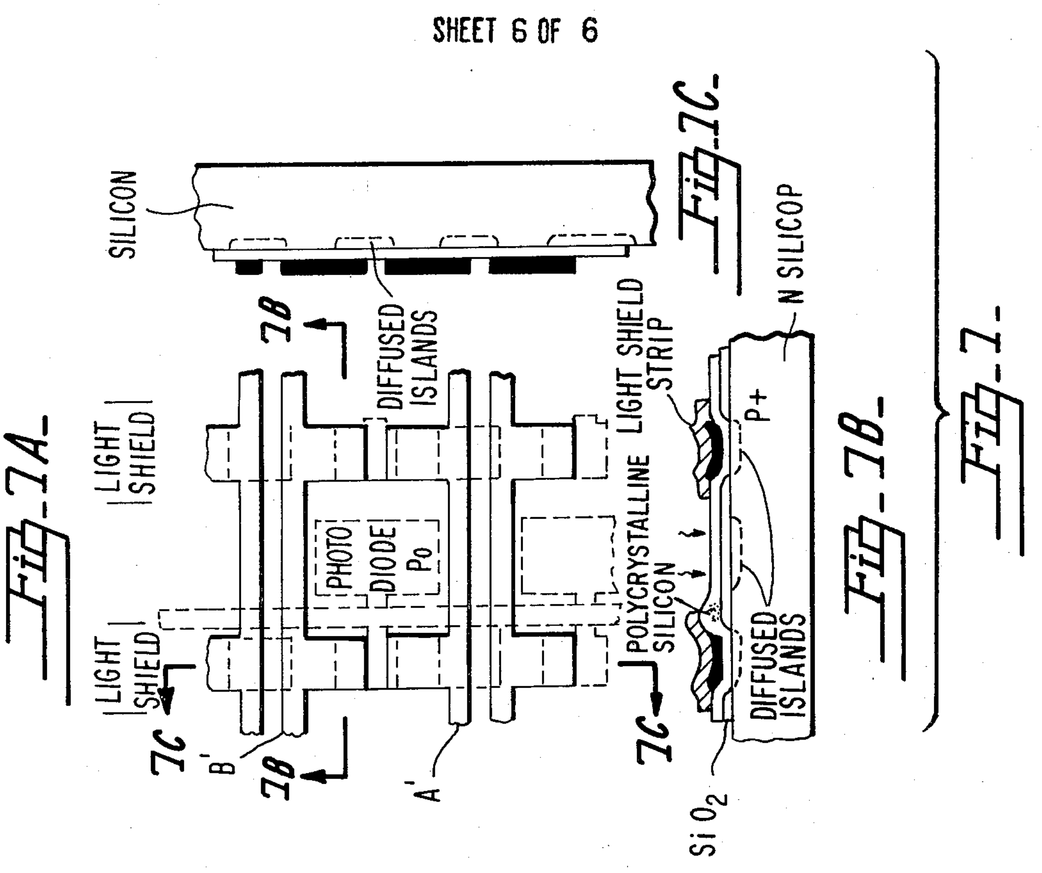
FIG. 7 is a layout of a photodiode sensing element coupled to bucket-brigate registers.

An alternative mode of operating the proposed array is obtained by connecting switch S3 to position 2 to which is applied an optional video input as shown in FIG. 1. The background signal from the sensor or other signals could be recorded on a separate analog storage device (not shown). The recorded background signal can be fed into the array simultaneously with the scanning of the array rather than feeding back a new background signal on each alternate frame. This mode of operation permits a corrected signal with its bckground subtracted to be obtained on every frame scan.

Where the sensing elements are, for example, photodiodes as shown in FIG. 7, a still different way of operating the sensor is possible. Signals can be transferred from the vertical registers to the sensor photodiodes which can then be used as temporary storage elements. That is, the capacitance can store charge. Thus, video signals introduced at the optional video input can be stored and combined with subsequent video or optical signals.

An important feature of the circuit is that the vertical transfer register is integral to the array. As already mentioned this permits noise cancellation or signal addition right at and within the array. Another feature of the circuit is that the vertical registers (as well as the horizontal registers) are not illuminated. As a result when the signals are transferred from the sensing elements to the registers there is no smearing or deterioration of the signals. These features are evident from the layouts of portions of the circuits embodying the invention shown in FIGS. 5, 6 and 7.

Figures 5, 5A, 5B, 5C:
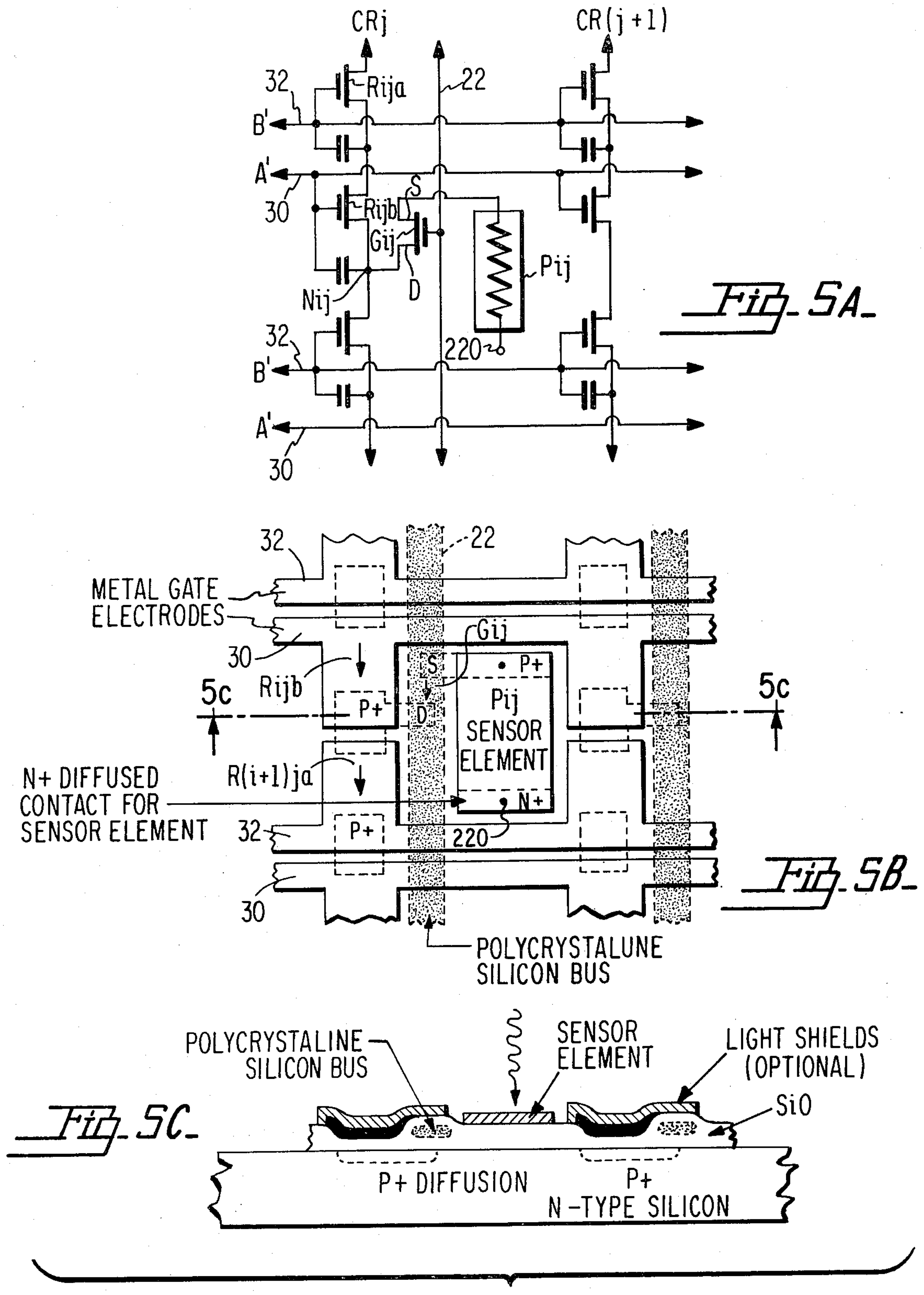
FIG. 5 is a layout of a photoconductor sensing element for use in the circuit of FIG. 2.

FIG. 5*a* is the circuit diagram of a sensing element $P_{ij}$, a gating transistor $G_{ij}$ and a portion of the corresponding vertical register CR*j* of FIG. 2. FIGS. 5*b* and 5*c* illustrate a layout of the circuit. In FIG. 5*b* the photoconductive sensing element $P_{ij}$ is deposited over the top of and adjacent to a bucket-brigade charge transfer register (transistors $R_{ijb}$, $R_{(i+1)ja}$). One end 220 of each sensing element, to which a fixed potential is applied, is connected to the substrate through a diffused N+ ohmic contact. The other end of the photoconductor is connected to a diffused P+ contact wich also serves as the source of transistor $G_{ij}$. P-channel transistors are illustrated, but N-channel devices could be used instead. The silicon MOS bucket-brigade registers are relatively simple to fabricate with a single layer of metallization. The transfer gate (22) structure of transistor $G_{ij}$ could be polycrystalline silicon strips which are covered with silicon dioxide to permit the metal bucket-brigade conductors 30 and 32 to cross over. The final step in fabrication is to deposit the sensing elements between the N+ and P+ diffused islands. Infrared-sensitive photoconductors, pyroelectric or other photosensitive elements can be used to fabricate the sensing element.

Figures 6, 6A, 6B, 6C:
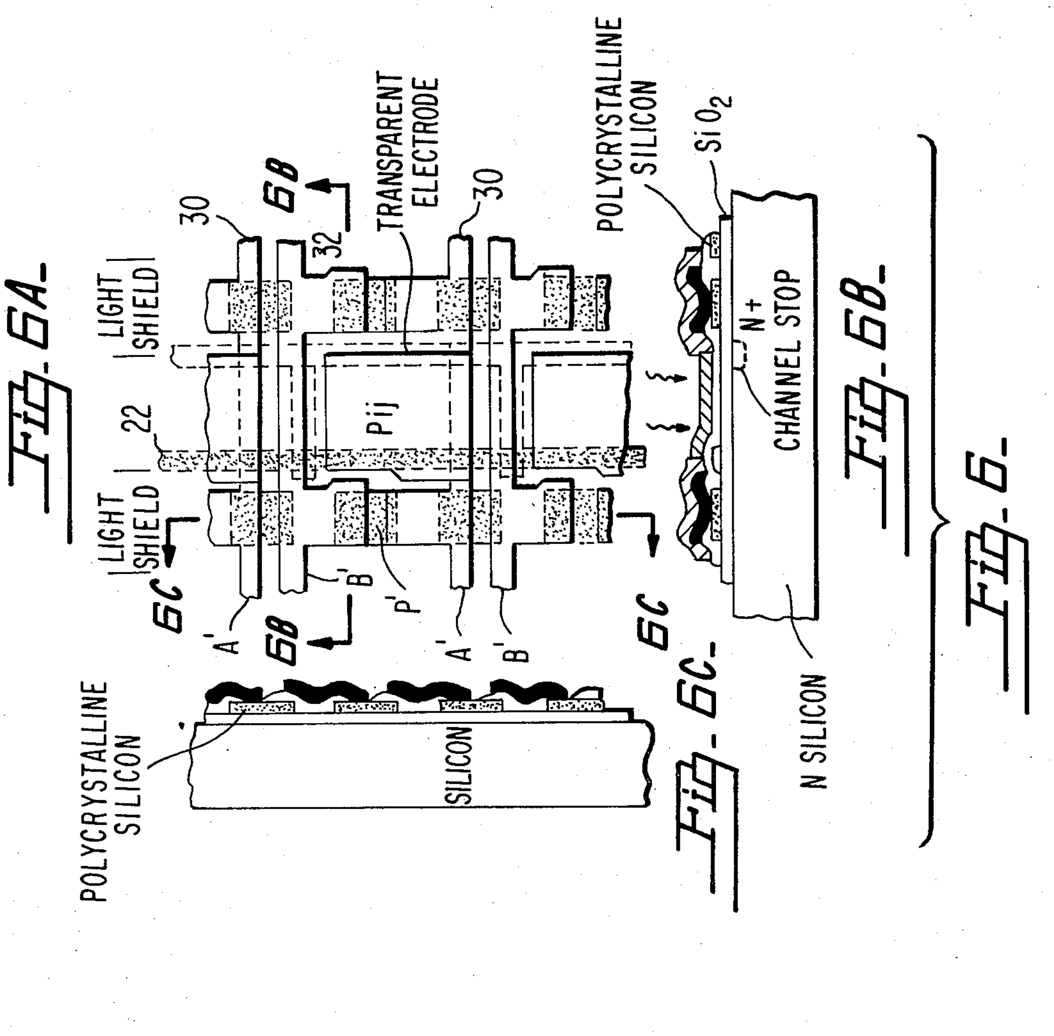
FIG. 6 is a layout of a sensing element connected to charge-coupled registers suitable for use in circuits embodying the invention.

FIG. 6 shows another sensor structure which can be operated in the modes discussed. In FIG. 6 the charge-transfer system is a two-phase silicon-gate charge-coupled register. The sensor elements $P_{ij}$ in this case are formed in the depletion layer at the surface of the silicon under the transparent metal electrode which is so labelled. No diffusions are required in the silicon in the picture area of the sensor. An array of polycrystalline silicon strips provides the conductor 22 which is common to the gates of the gating structure $G_{ij}$.

FIG. 7 illustrates the element of a bucket-brigade array which employs separate photodiodes at each element. This is a simple structure which uses a set of polycrystalline silicon strips for the gates of the transfer transistors $G_{ij}$. A single diffusion of P+ islands in the silicon provides the separate photodiodes and the sources and drains for the transistors of the bucket-brigade register.

FIGS. 5, 6 and 7 illustrate that the circuits embodying the invention can be fabricated using either bucket-brigade or charge-coupled registers. Evidently circuits and systems embodying the invention may be practiced with any suitable device. However, charge transfer devices are highly suited since they may be used to fabricate transfer registers having high functional density which also transfers signals from stage-to-stage very efficiently.

What is claimed is:

1. The combination comprising:

an array of sensing elements arranged in rows and columns, said elements producing a signal in response to electromagnetic radiation;

a number of nodes equal to the number of elements;

means for transferring, in parallel, the signal produced at each one of said elements to a different one of said nodes;

amplifying means having an input and an output;

charge transfer means coupled between each one of said nodes and the input of said amplifying means for transferring the signal from each node, to said amplifying means; and charge transfer means coupled between the output of said amplifying means and each one of said nodes for recirculating the signal, from a given node back to said given node.

2. The combination as claimed in claim 1 wherein said charge transfer means coupled between said nodes and the input of said amplifying means includes:

1. a column charge transfer register per column of elements, each column register having an input terminal and an output terminal and a number of stages between said terminals equal to the number of elements in a column, each one of said stages having an input which is common to a different one of said nodes;
2. an output charge transfer shift register having a number of inputs equal to the number of column registers and an output terminal, each one of the inputs of said output register being connected to a different one of the output terminals of said column registers; and
3. means for coupling the output terminal of said output register to the input of said amplifying means.

3. The combination as claimed in claim 2 wherein said charge transfer means coupled between the output of said amplifying means and each one of said nodes includes an input charge transfer shift register having an input terminal and a number of output nodes equal in number to said column registers, each one of said input node and output nodes of said input register being connected to a different one of said input terminals of said column registers.

4. The combination as claimed in claim 3 wherein said registers are of the bucket-brigade type.

5. The combination as claimed in claim 3 wherein said registers are of the charge-coupled type.

6. The combination as claimed in claim 3 wherein said amplifying means is an inverter.

7. The combination as claimed in claim 2 further including an output amplifier having an input and output; wherein said means for coupling the output terminal of said output register to the input of said amplifying means includes switch means for selectively coupling the output of said output register to said amplifying means for a first period of time and for couplilng the output of said output register to said input point of said output amplifier during a second successive, period of time.

8. An image sensor comprising an array of photosensitive elements arranged in M rows and N columns; N column charge transfer registers integral to the array, each register having M input nodes, an input terminal and an output terminal; each node of a column register corresponding to a different one of the sensing elements of a column;

M × N signal transfer means; each transfer means being connected between a sensing element and its corresponding node for, when enabled, transferring a signal between said element and its corresponding node;

an output charge transfer register having N inputs and an output terminal; means connectng each one of said N inputs to a different one of the output terminals of said column registers;

amplifying means having an input and an output;

means for selectively connecting the input of said charge amplifier to the output terminal of said output register;

and input charge transfer register having an input node and output nodes equal in number to the number of said column registers;

means connecting each one of said nodes of said input register to a different one of said input terminals of said column registers; and means for coupling the output of said amplifying means to said input node of said input register.

9. In the combination as claimed in claim 8 wherein said signal transfer means includes first signal means coupled to said signal transfer means for selectively transferring signals from each one of said sensing elements to their corresponding nodes;

further including second means coupled to said column registers for transferring signals from node-to-node along said column registers and for transferring one row of signals at a time, from said column registers to said output register;

further including third signal means coupled to said output register for transferring signals sequentially along said output register and to and through said amplifying means to said input node of said input register; and further including fourth signal means coupled to said input register for transferring a row of signals into said input register.

10. In the image sensor claimed in claim 8 wherein said photosensitive elements are photoconductors.

11. In the image sensor claimed in claim 8 wherein said photosensitive elements are photodiodes.

12. In the image sensor claimed in claim 8 wherein said registers are bucket brigade charge transfer registers.

13. In the image sensor claimed in claim 8 wherein said registers are charge-coupled transfer registers.

14. The combination as claimed in claim 8 further including an optional input terminal for the application thereto of signals to be transferred to said nodes of said column registers, and wherein said means for coupling the output of said amplifying means to said input node of said input register includes switch means for selectively disconnecting the output of said amplifying means from said input node and for selectively connecting said optional input terminal to said input node of said input register.

* * * * *

UNITED STATES PATENT OFFICE
CERTIFICATE OF CORRECTION

Patent No. 3,856,989 Dated December 24, 1974

Inventor(s) Paul Kessler Weimer

It is certified that error appears in the above-identified patent and that said Letters Patent are hereby corrected as shown below:

The following errors were found in the patent:

Col 5, line 49 delete "to" (second occurrence)

Col 6, line 14 "wich" should be ---which---

Col 7, line 20 "begin" should be ---begins---

Col 7, line 28 "11" should be ---I1---

Col 8, line 52 "mode" should be ---node---

Col 11, line 4 before "output" (second occurrence) insert ---an---

Col 12, line 7 before "means" insert ---signal---

Signed and sealed this 22nd day of April 1975.

(SEAL)
Attest:

RUTH C. MASON
Attesting Officer

C. MARSHALL DANN
Commissioner of Patents and Trademarks